US008494668B2

(12) United States Patent
Ong et al.

(10) Patent No.: US 8,494,668 B2
(45) Date of Patent: Jul. 23, 2013

(54) SOUND SIGNAL PROCESSING APPARATUS AND METHOD

(75) Inventors: Bee Suan Ong, Delft (NL); Sebastian Streich, Delft (NL); Takuya Fujishima, Hamamatsu (JP); Keita Arimoto, Hamamatsu (JP)

(73) Assignee: Yamaha Corporation, Hamamatsu shi (JP)

( * ) Notice: Subject to any disclaimer, the term of this patent is extended or adjusted under 35 U.S.C. 154(b) by 1188 days.

(21) Appl. No.: 12/378,719

(22) Filed: Feb. 19, 2009

(65) Prior Publication Data

US 2009/0216354 A1 Aug. 27, 2009

(30) Foreign Application Priority Data

Feb. 19, 2008 (JP) ................................ 2008-037654

(51) Int. Cl.

| | |
|---|---|
| ***G06F 17/00*** | (2006.01) |
| ***G10L 15/00*** | (2006.01) |
| ***G10L 15/06*** | (2006.01) |
| ***G10L 11/00*** | (2006.01) |
| ***G10L 21/06*** | (2006.01) |

(52) U.S. Cl.
USPC .............. 700/94; 704/239; 704/243; 704/276

(58) Field of Classification Search
USPC ............................................................ 700/94
See application file for complete search history.

(56) References Cited

U.S. PATENT DOCUMENTS

| | | | | |
|---|---|---|---|---|
| 6,542,869 | B1 | 4/2003 | Foote | |
| 7,179,982 | B2 * | 2/2007 | Goto | 84/616 |
| 7,284,004 | B2 * | 10/2007 | Cooper et al. | 1/1 |
| 7,659,471 | B2 * | 2/2010 | Eronen | 84/600 |
| 2003/0205124 | A1 * | 11/2003 | Foote et al. | 84/608 |
| 2004/0073554 | A1 * | 4/2004 | Cooper et al. | 707/100 |
| 2005/0241465 | A1 * | 11/2005 | Goto | 84/616 |
| 2009/0287323 | A1 * | 11/2009 | Kobayashi | 700/94 |

FOREIGN PATENT DOCUMENTS

EP 1 577 877 A1 9/2005

OTHER PUBLICATIONS

Extended European Search Report for Application No. EP 09152985.9, dated Jun. 9, 2009 (8 pgs.).

Bee Suan Ong, Structural Analysis and Segmentation of Music Signals, (2006; No. XP-002490384) (pp. 1-157).

* cited by examiner

*Primary Examiner* — Davetta W Goins
*Assistant Examiner* — Daniel Sellers
(74) *Attorney, Agent, or Firm* — Pillsbury Winthrop Shaw Pittman LLP

(57) ABSTRACT

Character value of a sound signal is extracted for each unit portion, and degrees of similarity between the character values of the individual unit portions are calculated and arranged in a matrix configuration. The matrix has arranged in each column the degrees of similarity acquired by comparing, for each of the unit portions, the sound signal and a delayed sound signal obtained by delaying the sound signal by a time difference equal to an integral multiple of a time length of the unit portion, and it has a plurality of the columns in association with different time differences. Repetition probability is calculated for each of the columns corresponding to the different time differences in the matrix. A plurality of peaks in a distribution of the repetition probabilities are identified. The loop region in the sound signal is identified by collating a reference matrix with the degree of similarity matrix.

13 Claims, 5 Drawing Sheets

SOUND SIGNAL PROCESSING APPARATUS AND METHOD

BACKGROUND

The present invention relates to a technique for detecting or identifying, from a sound signal, a repetition of a plurality of portions that are similar to each other in musical character.

Heretofore, there have been proposed various techniques for identifying, from a music piece, a portion where a musical character of performance tones satisfies a predetermined condition. Japanese Patent Application Laid-open Publication No. 2004-233965, for example, discloses a technique for identifying a refrain (or chorus) portion of a music piece by appropriately putting together a plurality of portions of a sound signal, obtained by recording performance tones of the music piece, which are similar to each other in musical character.

The technique disclosed in the No. 2004-233965 publication can identify with a high accuracy a refrain portion of a music piece if the music piece is simple and clear in musical construction (e.g., pop or rock music piece having clear introductory and refrain portions) and the refrain portion continues for a relatively long time (i.e., has relatively long duration). However, with the technique disclosed in the No. 2004-233965 publication which is only intended to identify a refrain portion of a music piece, it is difficult to identify with a high accuracy a particular portion of a music piece where one or more portions each having a short time length (i.e., short-time portions) are repeated successively, e.g. a piece of electronic music where performance tones of a bass or rhythm guitar are repeated in one or more short-time portions each having a time length of about one or two measures.

SUMMARY OF THE INVENTION

In view of the foregoing, it is an object of the present invention to provide a technique which can also identify with a high accuracy a portion of a music piece where a short-time portion is repeated.

In order to accomplish the above-mentioned object, the present invention provides an improved sound signal processing apparatus for identifying a loop region where a similar musical character is repeated in a sound signal, which comprises: a character extraction section that divides the sound signal into a plurality of unit portions and extracts a character value of the sound signal for each of the unit portions; a degree of similarity calculation section that calculates degrees of similarity between the character values of individual ones of the unit portions; a first matrix generation section that generates a degree of similarity matrix by arranging the degrees of similarity between the character values of the individual unit portions, calculated by the degree of similarity calculation section, in a matrix configuration, the degree of similarity matrix having arranged in each column thereof the degrees of similarity acquired by comparing, for each of the unit portions, the sound signal and a delayed sound signal obtained by delaying the sound signal by a time difference equal to an integral multiple of a time length of the unit portion, the degree of similarity matrix having a plurality of the columns in association with different time differences equal to different integral multiples of the time length of the unit portion; a probability calculation section that, for each of the columns corresponding to the different time differences in the degree of similarity matrix, calculates a repetition probability indicative of a level of similarity on the basis of the degree of similarity; a peak identification section that identifies a plurality of peaks in a distribution of the repetition probabilities calculated by the probability calculation section; a second matrix generation section that generates a reference matrix having a plurality of columns corresponding to different time differences equal to different integral multiples of the time length of the unit portion and having predetermined reference values arranged in the columns associated with positions of the time differences where the plurality of peaks identified by the peak identification section are located; and a collation section that identifies the loop region in the sound signal by collating the reference matrix with the degree of similarity matrix.

Because the sound signal processing apparatus of the present invention is arranged to identify the loop region by collating, with the degree of similarity matrix, the reference matrix set in accordance with the positions of the individual peaks in the distribution of the repetition probabilities calculated from the degree of similarity matrix.

In a preferred embodiment, the collation section includes: a correlation calculation section that calculates correlation values along a time axis of the sound signal by applying the reference matrix to the degree of similarity matrix, and a sound signal portion identification section that identifies the loop region on the basis of peaks in a distribution of the correlation values calculated by the correlation calculation section.

Further, in a preferred embodiment, the peak identification section includes: a period identification section that identifies a period of the peaks in the distribution of the repetition probabilities; and a peak selection section that selects a plurality of peaks appearing with the period, identified by the period identification section, in the distribution of the repetition probabilities. The period identification by the period identification section may be performed using a conventionally-known technique, such as auto-correlation arithmetic operations or frequency analysis (e.g., Fourier transform).

If the number of the peaks to be identified from the distribution of the repetition probabilities is too great (namely, if the size of the reference matrix is too great), it would be difficult to detect a loop region of a relatively short time length. If, on the other hand, the number of the peaks to be identified from the distribution of the repetition probabilities is too small, so many sound signal portions including short-time repetitions would be detected as loop regions. Thus, in a preferred embodiment of the present invention, the peak identification section limits, to within a predetermined range, the total number of the peaks to be identified from the distribution of the repetition probabilities. Because the total number of the peaks to be identified by the peak identification section is limited to within the predetermined range like this, the sound signal processing apparatus can advantageously identify each loop region of a suitable time length with a high accuracy. For example, in order to detect, as a loop region, a short-time repetition as well, the total number of the peaks to be identified is limited to below a predetermined threshold value, while, in order to prevent a short-time repetition from being detected as a loop region, the total number of the peaks to be identified is limited to above a predetermined threshold value.

Loop region identification based on the positions of peaks in the distribution of the correlation values may be performed in any desired manner. For example, the portion identification section may identify, as a loop region, a sound signal portion running from a time point of a peak in the distribution of the correlation values to a time point when a reference length corresponding to a size of the reference matrix terminates. However, in a case where a loop region lasts over a time length exceeding the size of the reference matrix, a peak detected from the distribution of the correlation values may probably have a flat top. Thus, when a peak having a flat top is detected, the portion identification section of the present invention preferably identifies, as a loop region, a sound signal portion having a start point that coincides with the leading edge of the peak and an end point that coincides with a time point located a reference length, corresponding to the size of the reference matrix, from the trailing edge of the peak.

The sound signal processing apparatus of the present invention may be implemented not only by hardware (electronic circuitry), such as a DSP (Digital Signal Processor) dedicated to processing of input sounds, but also by cooperation between a general-purpose arithmetic operation processing device, such as a CPU (Central Processing Unit), and a program. The program of the present invention is a process for causing a computer to perform a process for identifying a loop region, where a plurality of repeated portions are arranged, from a sound signal, which comprises: a character extraction operation for extracting a character value of the sound signal for each of unit portions of the signal; a degree of similarity calculation operation for calculating degrees of similarity between the character values of the individual unit portions; a first matrix generation operation for generating a degree of similarity matrix by arranging the degrees of similarity between the character values of the individual unit portions in a matrix configuration (i.e., in a plane including a time axis and a time difference axis), the degree of similarity matrix having arranged in each column (similarity column line corresponding to a high degree-of-similarity portion of the sound signal) thereof the degrees of similarity acquired by comparing, for each of the unit portions, the sound signal and a delayed sound signal obtained by delaying the sound signal by a time difference equal to an integral multiple of a time length of the unit portion; a probability calculation operation for, for each of the time differences in the degree of similarity matrix, calculating a repetition probability corresponding to a ratio of the high degree-of-similarity portion; a peak identification operation for identifying a plurality of peaks in a distribution of the repetition probabilities; a second matrix generation operation for generating a reference matrix having a plurality of reference column lines at positions of the peaks identified by the peak identification operation; a correlation calculation operation for, for each of a plurality of time points on the time axis of the degree of similarity matrix, calculating a correlation value between the reference column line of the reference matrix and the similarity column line of the degree of similarity matrix; and a portion identification operation for identifying a loop region on the basis of peaks in a distribution of the correlation values. The program of the present invention may not only be supplied to a user stored in a computer-readable storage medium and then installed in a user's computer, but also be delivered to a user from a server apparatus via a communication network and then installed in a user's computer.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
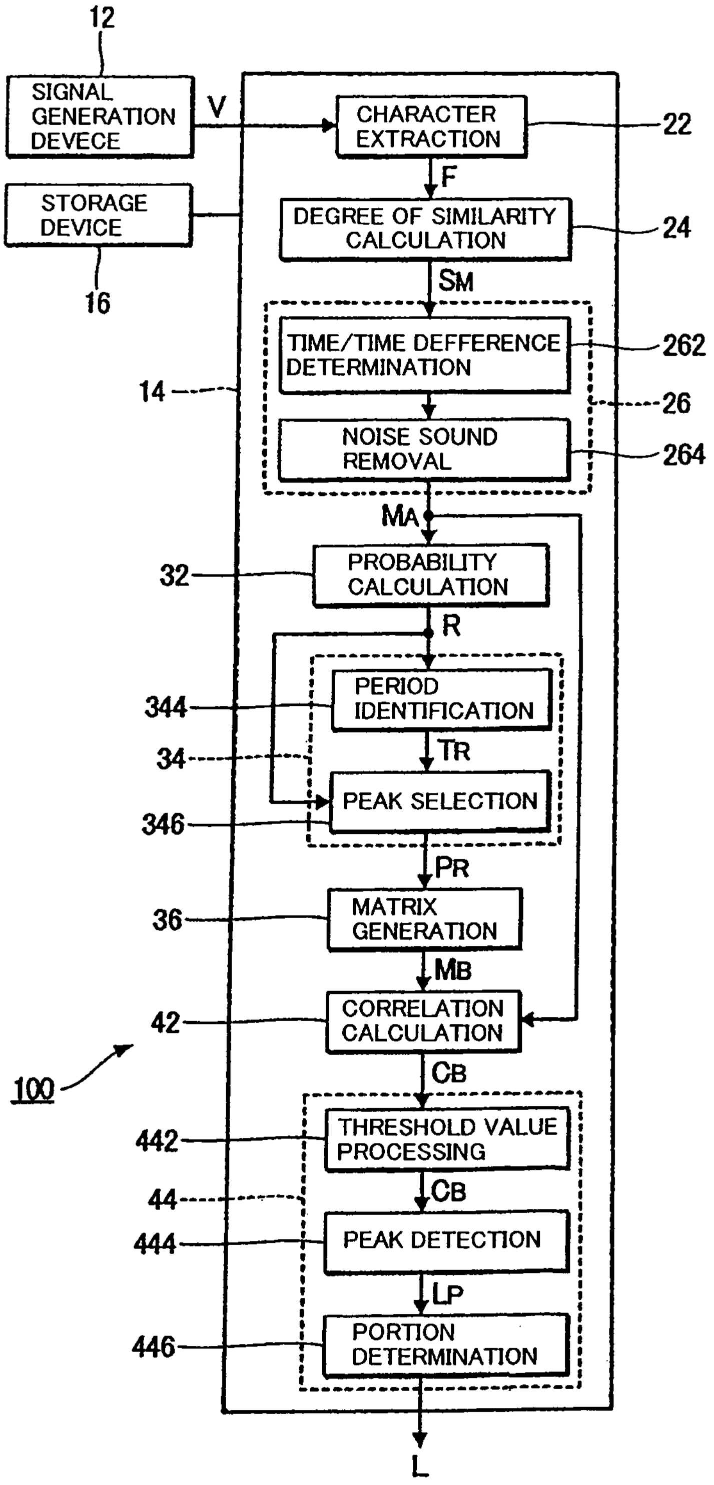
FIG. 1 is a block diagram of a sound processing apparatus according to an embodiment of the present invention.

FIG. 1 is a block diagram of a sound processing apparatus according to an embodiment of the present invention. Signal generation device 12 is connected to the sound processing apparatus 100, and it generates a sound signal V indicative of a time waveform of a performance sound (tone or voice) of a music piece and outputs the generated sound signal V to the sound processing apparatus 100. Preferably, the signal generation device 12 is in the form of a reproduction device that acquires a sound signal V from a storage medium (such as an optical disk or semiconductor storage circuit) and then outputs the acquired sound signal V, or a communication device that receives a sound signal V from a communication network and then outputs the received sound signal V.

Figure 2:
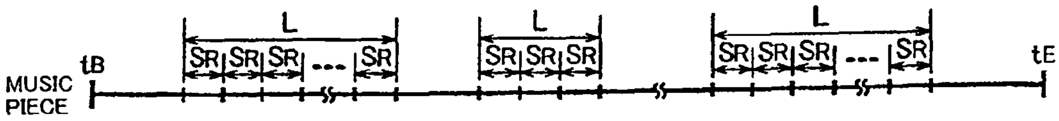
FIG. 2 is a conceptual diagram showing loop regions and repeated portions of a music piece.

The sound processing apparatus 100 identifies a loop region of a sound signal V supplied from the signal generation device 12. As seen in FIG. 2, the loop region L is a region of a music piece, lasting a start point tB to an end point tE, where a plurality of portions (hereinafter referred to as "repeated portions") SR, similar to each other in musical character, are repeated successively. One or a plurality of loop regions L may be included in a music piece, or no such loop region L may be included in a music piece.

As shown in FIG. 1, the sound processing apparatus 100 includes a control device 14 and a storage device 16. The control device 14 is an arithmetic operation processing device (such as a CPU) that functions as various elements as shown in FIG. 1 by executing corresponding programs. The storage device 16 stores therein various programs to be executed by the control device 14, and various data to be used by the control device 14. Any desired conventionally-known storage device, such as a semiconductor device or, magnetic storage device, may be employed as the storage device 16. Each of the elements of the control device 14 is implemented by a dedicated electronic circuit, such as a DSP. The elements of the control device 14 may be provided distributively in a plurality of integrated circuits.

Character extraction section 22 of FIG. 1 extracts a sound character value F of a sound signal V for each of a plurality of unit portions (i.e., frames) obtained by dividing the sound signal V on the time axis. The unit portion is set at a time length sufficiently smaller than that of the repeated portion SR. The sound character value F is preferably in the form of a PCP (Pitch Class Profile). The PCP is a set of intensity values of frequency components corresponding to twelve chromatic scale notes (C, C#, D, . . . , A#, B) in a spectrum obtained by dividing a frequency spectrum of the sound signal V every frequency band corresponding to one octave and then adding together the divided frequency spectra (namely, twelve-dimensional vector comprising numerical values obtained by adding together, over a plurality of octaves, the intensity values of the frequency components corresponding to the twelve chromatic scale notes). Thus, it is preferable that the character extraction section 22 comprises a means for performing frequency analysis, including discrete Fourier transform (i.e., short-time Fourier transform), on the sound signal V. Such a PCP is described in detail in Japanese Patent Application Laid-open Publication No. 2000-298475. Note, however, that the type of sound character values F is not limited to the PCP.

Degree of similarity calculation section 24 calculates numerical values (hereinafter referred to as "degrees of similarity") SM, which are indices of similarity, by comparing between sound character values F of individual unit portions. More specifically, the degree of similarity calculation section 24 calculates a degree of similarity in sound character value F between every pair of unit portions. If the sound character values F are represented as vectors, a Euclidean distance or cosine angle between sound character values F of every pair of the unit portions to be compared is calculated (or evaluated) as the degree of similarity SM.

Figure 3:
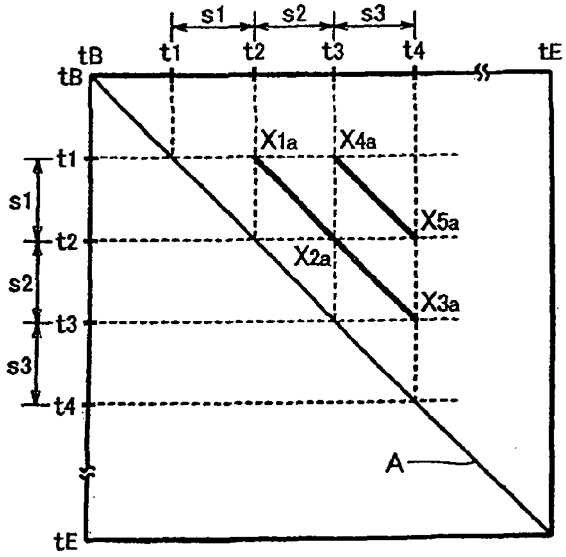
FIG. 3 is a conceptual diagram showing results of calculations performed by a similarity calculation section of the sound processing apparatus.

FIG. 3 is a conceptual diagram showing results of the calculations by the degree of similarity calculation section 24, where the passage of time from the start point tB to the end point tE of a music piece is shown on both of the vertical and horizontal axes. Points corresponding to pairs of the unit portions presenting high degrees of similarity SM are indicated by thick lines in FIG. 3. Note that a straight line A is a base line that is a line of a highest degree of similarity SM for a same unit portion (that, of course, indicates an exact match in sound character value F). However, such a base line is excluded from similarity determination results, and thus, it is only necessary that the similarity calculation be performed substantively between each unit portion and each individual one of the other unit portions. The following description assumes that a high degree of similarity SM in character value F is obtained for a unit portion s3 located from time point t3 to time point t4.

Figure 4:
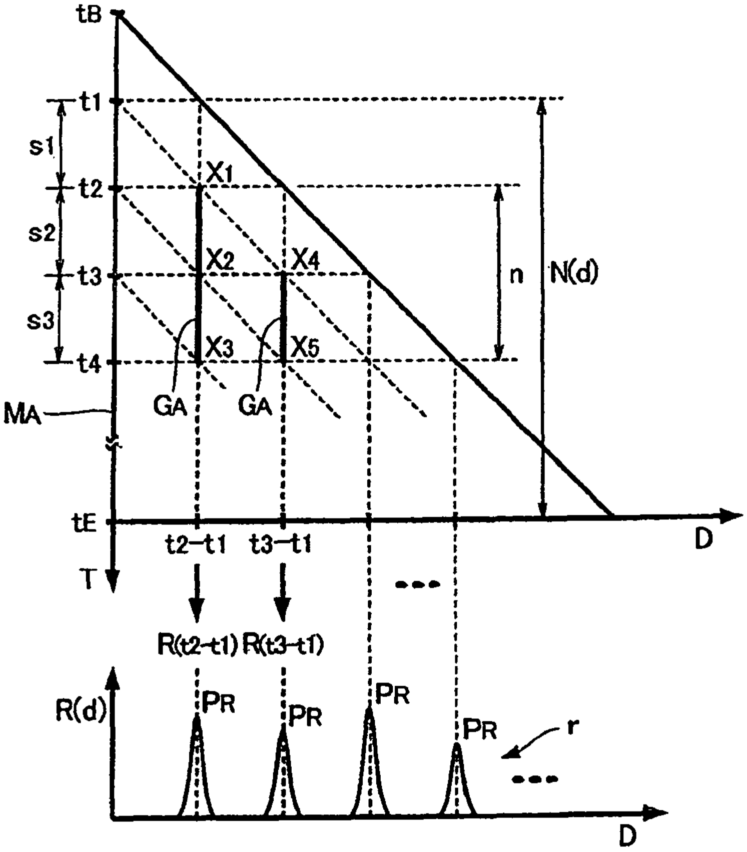
FIG. 4 is a conceptual diagram showing a degree of similarity matrix and a distribution of repetition probabilities.

The matrix generation section 26 of FIG. 1 generates a degree of similarity matrix MA on the basis of the degrees of similarity SM calculated by the degree of similarity calculation section 24. FIG. 4 is a conceptual diagram showing a degree of similarity matrix. As shown in FIG. 4, the degree of similarity matrix MA is a matrix which indicates, in a plane including the time axis T and time difference axis D (shift amount d), degrees of similarity SM in character value F between individual unit portions of a sound signal V and individual unit portions of the sound signal V delayed by a shift amount d along the time axis. The time axis T indicates the passage of time from the start point tB to the end point tE of the music piece, while the time difference axis D indicates the shift amount (delay amount) d, along the time axis, of the sound signal V. As indicated by thick lines in FIG. 4, lines (hereinafter referred to as "similarity column lines") GA indicative of unit portions presenting high degrees of similarity SM with the other unit portions of the music piece are plotted in the degree of similarity matrix MA.

In other words, in the degree of similarity matrix MA, degrees of similarity obtained by comparing, for each of the unit portions, the sound signal V and a delayed sound signal obtained by delaying the sound signal V by a time corresponding to an integral multiple of the time length of the unit portion are put in a column, and a plurality of such columns are included in the matrix MA in association with the time differences corresponding to different integral multiples of the time length of the unit portion. Namely, the time axis T is a row axis, while the time difference axis D is a column axis. The "shift amount d" is a delay time whose minimum length is equal to the time length of the unit portion.

Figure 5:
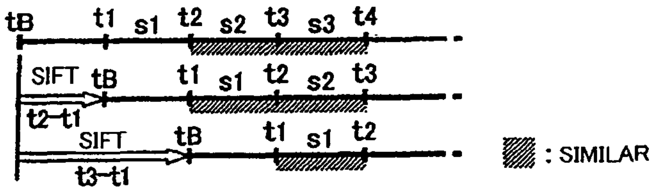
FIG. 5 is a conceptual diagram explanatory of shift amounts and similarity between individual segments.

Because the portion s1 (t1-t2) and portion s2 (t2-t3) are similar to each other in character value F between their respective unit portions as illustrated in FIG. 3, a character value F of the portion s1 of the sound signal V delayed by a time length (t2-t1) is similar to a character value F of the portion s2 the corresponding undelayed sound signal V that corresponds, on the time axis, to the section s1 of the delayed sound signal V, as seen in FIG. 5. Thus, a similarity column line GA (X1-X2) corresponding to the portion s2 is plotted at a time point of the time difference axis D where the shift amount d is (t2-t1). Point X1 corresponds to point X1*a* of FIG. 3, and point X2 corresponds to point X2*a* of FIG. 3. Similarly, a similarity column line GA from point X2 to point X3 (i.e., point corresponding to point X3*a* of FIG. 3) indicates that portion s2 (t2-t3) and portion s3 (t3-t4) have a high degree of similarity SM in character value F between their respective unit portions. Further, that portion s1 (t1-t2) of the sound signal V delayed by a time length (t3-t1) and portion s3 (t3-t4) of the sound signal V before delayed (i.e., corresponding undelayed sound signal V) are similar in character value F is indicated by a similarity column line GA from point X4 (corresponding to X4*a* of FIG. 3) to point X5 (corresponding to X5*a* of FIG. 3) in the degree of similarity matrix MA of FIG. 4.

As shown in FIG. 1, the matrix generation section 26 includes a time/time difference determination section 262 and a noise sound removal section 264. The time/time difference determination section 262 arranges degrees of similarity SM, calculated by the degree of similarity calculation section 24, in the T-D plane. The noise sound removal section 264 performs a threshold value process and filter process on the degrees of similarity SM having been processed by the time/time difference determination section 262. The threshold value process binarizes the degrees of similarity SM, calculated by the degree of similarity calculation section 24, by comparing them to a predetermined threshold value. Namely, each degree of similarity SM equal to or greater than the predetermined threshold value is converted into a first value (e.g., "1") b1, while each degree of similarity SM smaller than the predetermined threshold value is converted into a second value (e.g., "0") b2. In the degree of similarity matrix MA of FIG. 4, each similarity column line GA represents a portion where a plurality of the first values b1 are arranged in a straight line.

Note that, in a case where the degree of similarity SM is high only in a small number of unit portions, some area of the degree of similarity matrix MA where the second values b2 are distributed may be dotted with a few first values b1. Further, in practice, even portions musically similar to each other may be dissimilar in character value F to each other in only a few unit portions, and thus, some arrays of the first values b1 maybe spaced from each other with a slight interval (i.e., interval corresponding to an area of the second values b2) along the time axis T. The filter process (Morphological Filtering) performed by the noise sound removal section 264 includes an operation for removing the first values b1, distributively located in the T-D plane, following the threshold value process, and an operation for interconnecting a plurality of the arrays of the first values b1 that are located in spaced-apart relation to each other with a slight interval along the time axis T. Namely, the noise sound removal section 264 removes, as noise, the first values b1 other than those values constituting the similarity column line GA exceeding a predetermined length. Through the aforementioned processing, the degree of similarity matrix MA of FIG. 4 can be generated.

Probability calculation section 32 of FIG. 1 calculates a repetition probability R per shift amount d (i.e., per column) on the time difference axis D of the degree of similarity matrix MA. The repetition probability R is a numerical value indicative of a ratio of portions determined to present a high degree of similarity (i.e., similarity column lines GA) to a section from the start point tB of a sound signal V delayed by the shift amount d to the end point tE of the corresponding undelayed sound signal V. As shown in FIG. 4, for example, the repetition probability R(d) corresponding to the shift amount d is calculated as a ratio of the number n of degrees of similarity SM set at the first value b1 (i.e., total length of the similarity column lines GA) to the total number N(d) of degrees of similarity SM corresponding to the shift amount d (i.e., total number of the first and second values b1 and b2 corresponding to the shift amount d) (namely, R(d)=n/N(d)). Such division by the total number N(d) is an operation for normalizing the repetition probability R(d) so as not to depend on variation in the total number N(d) corresponding to variation in the shift amount d. The total number N(d) of degrees of similarity SM is equal to the total number of the unit portions in the entire section (tB-tE) of the sound signal V with the shift amount d subtracted therefrom. As understood from the foregoing, the repetition probability R(d) is an index indicative of a ratio of portions similar between the sound signal V delayed by the shift amount d and the corresponding undelayed sound signal V (i.e., total number of unit portions similar in character value F between the delayed and undelayed sound signals V).

In FIG. 4, a distribution of repetition probabilities (i.e., repetition probability distribution) r calculated by the probability calculation section 32 for the individual shift amounts d is shown together with the aforementioned degree of similarity matrix MA. In the repetition probability distribution r, peaks PR appear at intervals corresponding to a repetition cycle of repeated portions SR in a loop region L. Peak identification section 34 of FIG. 1 identifies m (m is a natural number equal to or greater than two) peaks PR in the repetition probability distribution r. As explained below by way of example, each peak PR is identified using auto-correlation arithmetic operations of the repetition probability distribution r.

Figure 6:
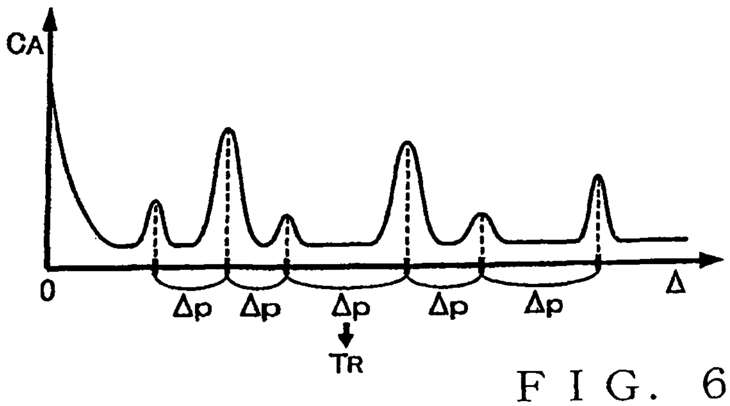
FIG. 6 is a conceptual diagram showing a distribution of correlation values.

The peak identification section 34 includes a period identification section 344 and a peak selection section 346. The period identification section 344 identifies a period TR of the peaks PR in the repetition probability distribution r, using auto-correlation arithmetic operations performed on the repetition probability distribution r. Namely, while moving (i.e., shifting) the repetition probability distribution r along the time difference axis D, the period identification section 344 first calculates a correlation value CA between the repetition probability distributions r before and after the shifting, to thereby identify relationship between the shift amount Δ and the correlation value CA. FIG. 6 is a conceptual diagram showing the relationship between the shift amount Δ and the correlation value CA. As shown in FIG. 6, the correlation value CA increases as the shift amount Δ approaches the period of the repetition probability distribution r.

Then, the period identification section identifies a period TR of the peaks PR in the repetition probability distribution r on the basis of results of the auto-correlation arithmetic operations. For example, the period identification section 344 calculates intervals Δp between a plurality of adjoining peaks, as counted from a point at which the shift amount is zero, of a multiplicity of peaks appearing in a distribution of the correlation values CA, and it determines a maximum value of the intervals Δp as the period TR of the peaks PR in the repetition probability distributions r.

Figure 7:
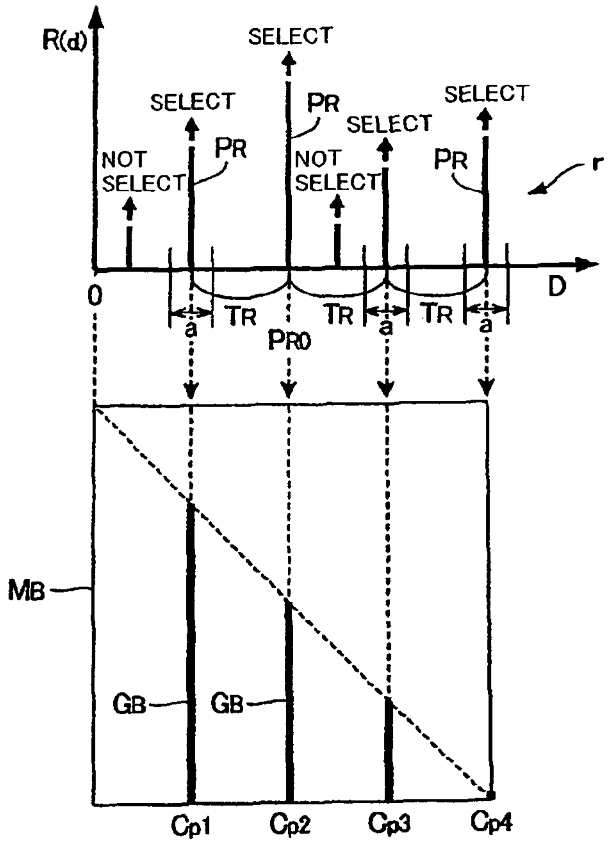
FIG. 7 is a conceptual diagram explanatory of selection of peaks in the repetition probability distribution and a reference matrix.

Peak selection section 346 of FIG. 1 selects, from among the peaks PR in the repetition probability distribution r, m peaks PR appearing with the period TR identified by the period identification section 344. FIG. 7 is a conceptual diagram explanatory of the process performed by the peak selection section 346 for selecting the m peaks PR from the repetition probability distribution r. Note that, in FIG. 7, the individual peaks PR in the repetition probability distribution r are indicated as vertical lines for convenience. As shown in FIG. 7, the peak selection section 346 selects, from among the peaks PR in the repetition probability distribution r, one peak PRO where the repetition probability R is the smallest, and then selects peaks PR present within predetermined ranges "a" spaced from the peak PRO in both of positive and negative directions of the time difference axis D by a distance equal to an integral multiple of the period TR.

The peak selection section 346 limits the number m of the peaks PR, which are to be selected from the probability distribution r, to below a threshold value TH1 (e.g., TH1=5). For example, if the number of the peaks PR detected from the probability distribution r is greater than the threshold value TH1, then m (m=TH1) peaks PR close to the original point of the time difference axis D are selected. In a case where the music piece does not include any clear loop region L, the number of the peaks PR in the probability distribution r is small, and thus, if the number m of the peaks PR detected from the probability distribution r is smaller than a predetermined threshold value TH2 (TH2<TH1, e.g., TH2=3), the peak selection section 346 informs a user, through image display or voice output, that the music piece does not include any loop region L. Namely, the number m of the peaks PR ultimately selected by the peak selection section 346 is limited to within a range of equal to or smaller than the threshold value TH1 but equal to or greater than the threshold value TH2. The threshold value TH1 and threshold value TH2 are variably controlled in accordance with a user's instruction. The following description assumes that the peak identification section 34 has identifies four peaks PR (i.e., m=4).

Matrix generation section 36 of FIG. 1 generates a reference matrix MB on the basis of the m peaks PR identified by the peak identification section 34. In FIG. 7, such a reference matrix MB is indicated together with the repetition probability distribution r. The reference matrix MB is a square matrix of M rows and M columns (M is a natural number equal to or greater than two). First column of the reference matrix MB corresponds to the original point of the time difference axis D, and an M-th column of the reference matrix MB corresponds to the position of the m-th peak PR identified by the peak identification section 34 (i.e., one of the m peaks PR which is remotest from the original point of the time difference, axis D). Namely, the reference matrix MB is variable in size (i.e., in the numbers of the columns and rows) in accordance with the position of the m-th peak PR identified by the peak identification section 34.

As shown in FIG. 7, the matrix generation section 36 first selects m. columns ("peak-correspondent columns") Cp corresponding to the positions (shift amounts d) of the individual peaks PR identified by the peak identification section 34 from among the M columns of the reference matrix MB. The peak-correspondent column Cp1 in FIG. 7 is the column corresponding to the position of the first peak PR as viewed from the original point of the time difference axis D (i.e., first column of the reference matrix MB). Similarly, the peak-correspondent column Cp2 corresponds to the position of the second peak PR, the peak-correspondent column Cp3 corresponds to the position of the third peak PR, and the peak-correspondent column Cp4 (M-th column) corresponds. to the position of the fourth peak PR (PR).

Then, the matrix generation section 36 generates a reference matrix MB by setting at the first value b1 (that is a predetermined reference value, such as "1") each of M numerical values belonging to the m peak correspondent columns Cp and located from a positive diagonal line (i.e., straight line extending from the first-row-first-column position to the M-th-row-M-th-column position) to the M-th row, and setting at the second value b2 (e.g., "0") each of the other numerical values belonging to the m peak correspondent columns Cp. In FIG. 7, regions where the numerical values are set at the first values b1 are indicated by thick lines. Stated otherwise, the reference matrix MB, which has a plurality of (i.e., M) columns corresponding to a plurality of different time differences equal to an integral multiple of the time length of the unit portion, has the first or predetermined reference values b1 (=1s) arranged in some of the columns associated with the time difference positions where the plurality of peaks identified by the peak identification section 34, and the other values b2 (=0s) arranged in the other columns.

As noted above, column lines (hereinafter referred to as "reference column lines") GB where the first reference values b1 (=1) are arranged are set in the individual peak-correspondent columns Cp of the reference matrix MB. Peaks PR appear in the repetition probability distribution r with a period corresponding to each of the repeated portions SR within the loop regions L. Thus, there is a high possibility that similarity column lines GA exist, in a similar manner to the reference column lines GB of the reference matrix MB, in areas of the degree of similarity matrix MA where the loop regions L are present.

In FIG. 1, a correlation calculation section 42 and portion identification section 44 function as a collation section for collating the reference matrix MB and degree of similarity matrix MA with each other to identify the loop regions L of the sound signal.

Figure 8:
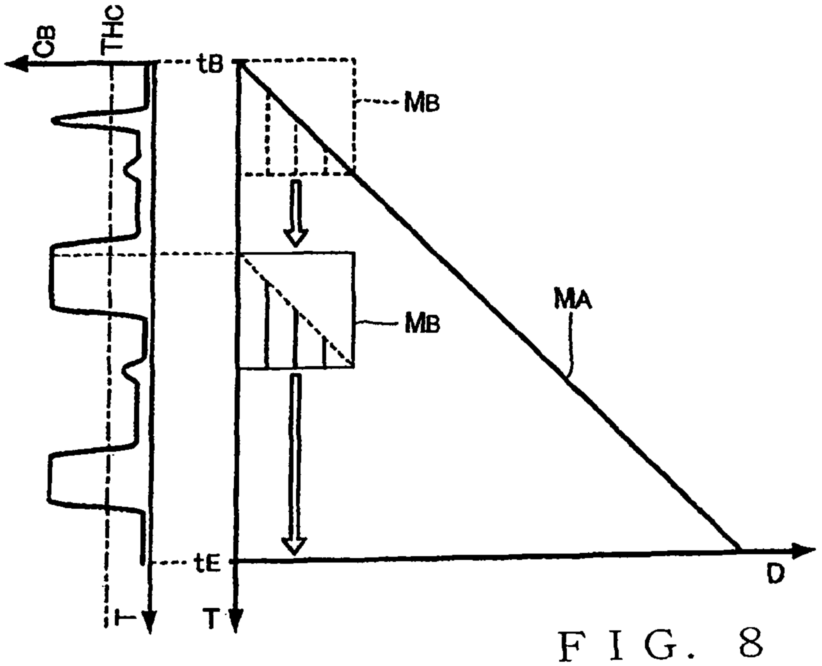
FIG. 8 is a conceptual diagram explanatory of a process for calculating correlation between the degree of similarity matrix and the reference matrix.

The correlation calculation section 42 of FIG. 1 performs collation between the individual regions in the degree of similarity matrix MA generated by the matrix generation section 26 and in the reference matrix MB generated by the matrix generation section 36, to thereby calculate correlation values CB between the regions and the reference matrix MB. FIG. 8 is a conceptual diagram explanatory of a process performed by the correlation calculation section 42. As shown in FIG. 8, the correlation calculation section 42 calculates the correlation value CB with the reference matrix MB placed in superposed relation to the degree of similarity matrix MA such that the first column (i.e., original point of the time difference axis D) of the degree of similarity matrix MA positionally coincides the first column of the reference matrix MB, while moving the reference matrix MB from the position, at which the first row positionally coincides with the original point of the time axis T, along the time axis T.

The correlation value CB is a numerical value functioning as an index of correlation (similarity) between forms of an arrangement (interval and total length) of the individual reference lines GB of the reference matrix MB and an arrangement of the individual similarity column lines GA of the degree of similarity matrix MA. For example, the correlation value CB is calculated by adding together a plurality of (i.e., M×M) numerical values obtained by multiplying together corresponding pairs of the numerical values (b1 and b2) in the reference matrix MB and the degrees of similarity SM (b1 and b2) in an M-row-M-column area of the degree of similarity matrix MA which overlaps the reference matrix MB.

Through the aforementioned process, the correlation value CB (i.e., relationship between the time axis T and the correlation value CB) is calculated for each of a plurality of time points on the time axis T of the degree of similarity matrix MA. As understood from the description about the aforementioned correlation value CB, the correlation value CB takes a greater value as the individual reference column lines GB of the reference matrix MB and the similarity column lines GA in the area of the degree of similarity matrix MA corresponding to the reference matrix MB are more similar in form.

Figure 9:
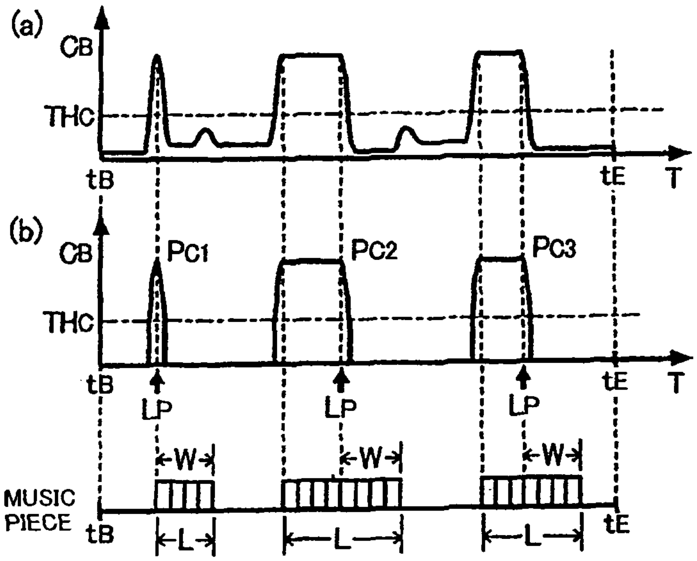
FIG. 9 is a conceptual diagram explanatory of a process for identifying a loop region.

The portion identification section 44 of FIG. 1 identifies loop regions L on the basis of peaks appearing in a distribution of the correlation values CB calculated by the correlation calculation section 42. As shown in FIG. 1, the portion identification section 44 includes a threshold value processing section 442, a peak detection section 444, and a portion determination section 446. FIG. 9 is a conceptual diagram explanatory of processes performed by various elements of the portion identification section 44.

As shown in (b) of FIG. 9, the threshold value processing section 442 removes components of the correlation values CB (see (a) of FIG. 9), calculated by the correlation calculation section 42, which are smaller than a predetermined threshold value THC; namely, each correlation value CB smaller than the predetermined threshold value THC is changed to the zero value. The peak detection section 444 detects peaks PC from a distribution of the correlation values CB having been processed by the threshold value processing section 442 and identifies respective positions LP of the detected peaks PC.

If the time length (i.e., "reference time length") of the reference matrix MB, corresponding to the number M of the rows of the reference matrix MB, agrees with the time length of a loop region L of the music piece, the correlation value CB increases only when the reference matrix MB is superposed on the loop region L on the time axis T. Thus, a peak PC (PC1) having a sharp top appears in the distribution of the correlation values CB, as shown in (b) of FIG. 9. Once such a sharp peak PC is detected, the peak detection section 444 identifies the top of the peak PC as the position LP. If the time length of the loop region L of the music piece is greater than the reference length, the correlation value CB keeps a great numerical value as long as the reference matrix MB moves within the range of the loop region L on the time axis T. Thus, peaks PC (PC2 and PC3) each having a flat top appear in the distribution of the correlation values CB. Once such a flat peak PC is detected, the peak detection section 444 identifies a trailing edge (falling point) of the peak PC as the position LP.

The portion determination section 446 identifies a loop region L on the basis of the position LP detected by the peak detection section 444. When the peak detection section 444 has detected the position LP of a sharp peak PC (PC1), the portion determination section 446 identifies, as a loop region (i.e., group of m repeated portions SR) L, a portion (music piece portion or sound signal portion) running from the position LP to a time point at which the reference time length W terminates. Once the peak detection section 444 detects the position LP of the trailing edge of the flat peak PC (PC2 or PC3), the portion determination section 446 identifies, as a loop region L, a portion (music piece portion or sound signal portion) running from the leading edge of the peak PC to a time point at which the reference time length W terminates. Namely, if the peak PC is flat, the loop region L is a portion that comprises an interconnected combination of a given number of repeated portions SR corresponding to a portion running from the leading edge to the trailing edge of the peak PC and m repeated portions SR.

Because the reference matrix MB, set in accordance with the positions LP of the individual peaks PR of the probability distribution r calculated from the degree of similarity matrix MA, is used to identify a loop region L, the instant embodiment can also detect with a high accuracy a loop region L comprising repeated portions SR each having a short time length.

If the number m of the peaks PR to be used for generation of the reference matrix MB is too great (namely, if the reference column lines GB of the reference matrix MB are too many), there would arise the problem that only a loop region L where the similarity column lines GA are similar to the reference matrix MB is detected for a long time. If, on the other hand, the number m of the peaks PR to be used for generation of the reference matrix MB is too small, there would arise the problem that an excessively great number of loops L are detected. However, the instant embodiment, where the number m of the peaks PR to be used for generation of the reference matrix MB is limited to the range between the threshold value TH1 and the threshold value TH2, can advantageously detect loop regions L each having an appropriate time length.

Further, in the instant embodiment, peaks PC having a flat top, in addition to peaks PC having a sharp top, can be detected from the distribution of the correlation values CB, and, for such a peak PC having a flat top, a sound signal portion running from the trailing edge (position LP) to the time point when the reference length W terminates is detected as a loop region L. As a consequence, even a loop region having a time length exceeding the reference length W can be detected with a high accuracy.

<Modification>

The above-described embodiment of the present invention may be modified variously as set forth below by way of example, and such modifications may be combined as desired.

Figure 10:
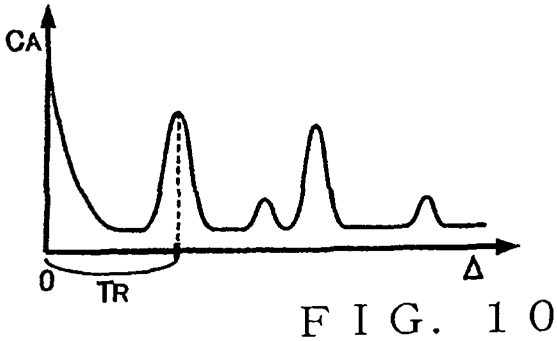
FIG. 10 is a conceptual diagram showing an alternative method for identifying a period of peaks in the repetition probability distribution.
Figure 11:
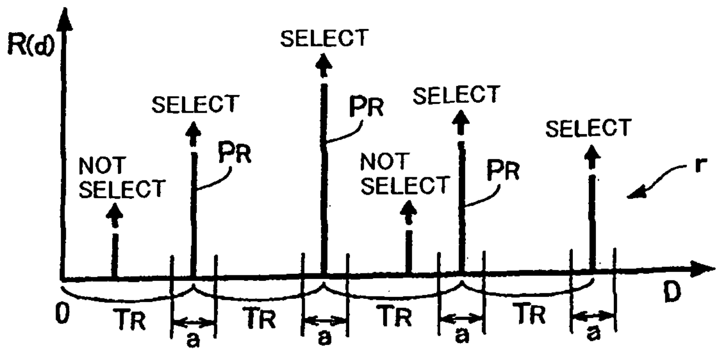
FIG. 11 is a conceptual diagram showing an alternative method for detecting peaks in the repetition probability distribution.

(1) Modification 1:

The method for detecting peaks PR from the repetition probability distribution r may be modified as desired. For example, the period identification section 344 of the peak identification section 34 identifies, as the period TR, an interval from the original point of the shift amount Δ (i.e., "Δ=0" point) to the point of the maximum value (peak) of the correlation values CA in the distribution of the correlation values CA, as shown in FIG. 10. Further, the peak selection section 346 selects peaks PR present within predetermined ranges "a" spaced from the original point of the time difference axis D of the probability distribution r in the positive direction by a distance equal to an integral multiple of the period TR.

Further, the method for identifying the period TR of the peaks PR appearing in the probability distribution r is not limited to the aforementioned scheme using auto-correlation arithmetic operations. For example, there may be employed an arrangement that identifies a frequency spectrum (or cepstrum) of the probability distribution r by performing frequency analysis, such as the Fourier transform, and identifies the period TR from frequencies of peaks in the identified frequency spectrum.

(2) Modification 2:

Results of the loop region detection may be used in any desired manners. For example, a new music piece may be made by appropriately interconnecting individual repeated portions SR of loop regions L detected by the sound processing apparatus 100. Results of the loop region detection may also be used in analysis of the organization of the music piece, such as measurement of a ratio of the loop regions L.

This application is based on, and claims priority to, JP PA 2008-037654 filed on 19 Feb. 2008. The disclosure of the priority application, in its entirety, including the drawings, claims, and the specification thereof, is incorporated herein by reference.

What is claimed is:

1. A sound signal processing apparatus for identifying a loop region where a similar musical character is repeated in a sound signal, said sound signal processing apparatus comprising:

a character extraction section that divides the sound signal into a plurality of unit portions and extracts a character value of the sound signal for each of the unit portions;

a degree of similarity calculation section that calculates degrees of similarity between the character values of individual ones of the unit portions;

a first matrix generation section that generates a degree of similarity matrix by arranging the degrees of similarity between the character values of the individual unit portions, calculated by said degree of similarity calculation section, in a matrix configuration, said degree of similarity matrix having arranged in each column thereof the degrees of similarity acquired by comparing, for each of the unit portions, the sound signal and a delayed sound signal obtained by delaying the sound signal by a time difference equal to an integral multiple of a time length of the unit portion, said degree of similarity matrix having a plurality of the columns in association with different time differences equal to different integral multiples of the time length of the unit portion;

a probability calculation section that, for each of the columns corresponding to the different time differences in the degree of similarity matrix, calculates a repetition probability indicative of a level of similarity on the basis of the degree of similarity;

a peak identification section that identifies a plurality of peaks in a distribution of the repetition probabilities calculated by said probability calculation section;

a second matrix generation section that generates a reference matrix having a plurality of columns corresponding to different time differences equal to different integral multiples of the time length of the unit portion and having predetermined reference values arranged in the columns associated with positions of the time differences where the plurality of peaks identified by said peak identification section are located; and a collation section that identifies the loop region in the sound signal by collating the reference matrix with the degree of similarity matrix.

2. The sound signal processing apparatus as claimed in claim 1 wherein said collation section includes:

a correlation calculation section that calculates correlation values along a time axis of the sound signal by applying the reference matrix to the degree of similarity matrix, and a sound signal portion identification section that identifies the loop region on the basis of peaks in a distribution of the correlation values calculated by said correlation calculation section.

3. The sound signal processing apparatus as claimed in claim 1 wherein said peak identification section includes:

a period identification section that identifies a period of the peaks in the distribution of the repetition probabilities; and a peak selection section that selects a plurality of peaks appearing with the period, identified by said period identification section, in the distribution of the repetition probabilities.

4. The sound signal processing apparatus as claimed in claim 1 wherein said peak identification section limits, to within a predetermined range, a total number of the peaks to be identified from the distribution of the repetition probabilities.

5. The sound signal processing apparatus as claimed in claim 2 wherein said portion identification section identifies, as a loop region, a sound signal portion running from a time point of a peak in the distribution of the correlation values to a time point when a reference length corresponding to a size of the reference matrix terminates.

6. The sound signal processing apparatus as claimed in claim 2 wherein, when a peak having a flat top is detected in a distribution of the correlation values, said portion identification section identifies, as a loop region, a sound signal portion having a start point that coincides with a leading edge of the peak and an end point that coincides with a time point located a reference length, corresponding to a size of the reference matrix, from a trailing edge of the peak.

7. The sound signal processing apparatus as claimed in claim 1 wherein said degree of similarity calculation section compares the character value of each of the unit portions and the character value of each individual one of other unit portions and calculates a degree of similarity between the compared character values.

8. The sound signal processing apparatus as claimed in claim 1 wherein the musical character is a phrase of a music piece.

9. The sound signal processing apparatus as claimed in claim 1 wherein said character extraction section extracts the character value on the basis of a pitch of the sound signal.

10. A method for identifying a loop region where a similar musical character is repeated in a sound signal, the sound signal being applied to a processing device which is configured to perform the following steps:

a step of dividing the sound signal into a plurality of unit portions and extracting a character value of the sound signal for each of the unit portions;

a degree of similarity calculation step of calculating degrees of similarity between the character values of individual ones of the unit portions;

a step of generating a degree of similarity matrix by arranging the degrees of similarity between the character values of the individual unit portions, calculated by said degree of similarity calculation step, in a matrix configuration, said degree of similarity matrix having arranged in each column thereof the degrees of similarity acquired by comparing, for each of the unit portions, the sound signal and a delayed sound signal obtained by delaying the sound signal by a time difference equal to an integral multiple of a time length of the unit portion, said degree of similarity matrix having a plurality of the columns in association with different time differences equal to different integral multiples of the time length of the unit portion;

a probability calculation step of, for each of the columns corresponding to the different time differences in the degree of similarity matrix, calculating a repetition probability indicative of a level of similarity on the basis of the degree of similarity;

a peak identification step of identifying a plurality of peaks in a distribution of the repetition probabilities calculated by said probability calculation step;

a step of generating a reference matrix having a plurality of columns corresponding to different time differences equal to different integral multiples of the time length of the unit portion and having predetermined reference values arranged in the columns associated with positions of the time differences where the plurality of peaks identified by said peak identification step are located; and a loop identification step of identifying the loop region in the sound signal by collating the reference matrix with the degree of similarity matrix.

11. A method as claimed in claim 10 wherein said loop identification step includes:

a correlation calculation step of calculating correlation values along a time axis of the sound signal by applying the reference matrix to the degree of similarity matrix, and a step of identifying the loop region on the basis of peaks in a distribution of the correlation values calculated by said correlation calculation step.

12. A computer-readable non-transitory storage medium storing a program causing a computer to perform a process for identifying a loop region where a similar musical character is repeated in a sound signal, said process comprising:

a step of dividing the sound signal into a plurality of unit portions and extracting a character value of the sound signal for each of the unit portions;

a degree of similarity calculation step of calculating degrees of similarity between the character values of individual ones of the unit portions;

a step of generating a degree of similarity matrix by arranging the degrees of similarity between the character values of the individual unit portions, calculated by said degree of similarity calculation step, in a matrix configuration, said degree of similarity matrix having arranged in each column thereof the degrees of similarity acquired by comparing, for each of the unit portions, the sound signal and a delayed sound signal obtained by delaying the sound signal by a time difference equal to an integral multiple of a time length of the unit portion, said degree of similarity matrix having a plurality of the columns in association with different time differences equal to different integral multiples of the time length of the unit portion;

a probability calculation step of, for each of the columns corresponding to the different time differences in the degree of similarity matrix, calculating a repetition probability indicative of a level of similarity on the basis of the degree of similarity;

a peak identification step of identifying a plurality of peaks in a distribution of the repetition probabilities calculated by said probability calculation step;

a step of generating a reference matrix having a plurality of columns corresponding to different time differences equal to different integral multiples of the time length of the unit portion and having predetermined reference values arranged in the columns associated with positions of the time differences where the plurality of peaks identified by said peak identification step are located; and a loop identification step of identifying the loop region in the sound signal by collating the reference matrix with the degree of similarity matrix.

13. The computer-readable non-transitory storage medium as claimed in claim 12 wherein said loop identification step includes:

a correlation calculation step of calculating correlation values along a time axis of the sound signal by applying the reference matrix to the degree of similarity matrix, and a step of identifying the loop region on the basis of peaks in a distribution of the correlation values calculated by said correlation calculation step.

* * * * *